US009465585B2

(12) United States Patent
Lewis et al.

(10) Patent No.: US 9,465,585 B2
(45) Date of Patent: Oct. 11, 2016

(54) METHOD FOR DETECTING A CORRELATION

(71) Applicant: Robert Bosch GmbH, Stuttgart (DE)

(72) Inventors: Matthew Lewis, Reutlingen (DE); Eberhard Boehl, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 307 days.

(21) Appl. No.: 14/207,028

(22) Filed: Mar. 12, 2014

(65) Prior Publication Data

US 2014/0280413 A1 Sep. 18, 2014

(30) Foreign Application Priority Data

Mar. 12, 2013 (DE) .................. 10 2013 204 274

(51) Int. Cl.
*G06F 7/58* (2006.01)
(52) U.S. Cl.
CPC .................................. *G06F 7/588* (2013.01)
(58) Field of Classification Search
CPC ....................................................... G06F 7/588
USPC ........................................................ 708/251
See application file for complete search history.

(56) References Cited

U.S. PATENT DOCUMENTS

| 6,795,837 B1* | 9/2004 | Wells | G06F 7/588 708/251 |
| 6,954,770 B1* | 10/2005 | Carlson | G06F 7/588 708/251 |
| 2010/0281088 A1* | 11/2010 | Wilber | G06F 7/588 708/251 |

FOREIGN PATENT DOCUMENTS

EP  1 686 458  8/2006

OTHER PUBLICATIONS

Bock, H. et al., "An Offset-Compensated Oscillator-Based Random Bit Source for Security Applications", CHES, pp. 268-281, 2005.
Bucci, M. et al., "Design of Testable Random Bit Generators", CHES, pp. 148-156, 2005.
Sunar, B. et al., "A Provably Secure True Random Number Generator with Built in Tolerance to Active Attacks", IEEE Trans. on Computers, vol. 56, No. 1, pp. 109-119, 2007.

* cited by examiner

*Primary Examiner* — Tan V. Mai
(74) *Attorney, Agent, or Firm* — Norton Rose Fulbright US LLP

(57) ABSTRACT

A method for detecting a correlation of a first ring oscillator with a second ring oscillator and a system for carrying out the method are provided. In the method, combinations of concatenations are compared to chronologically preceding concatenations.

10 Claims, 2 Drawing Sheets

METHOD FOR DETECTING A CORRELATION

FIELD OF THE INVENTION

The present invention relates to a method for detecting a correlation between at least two ring oscillators and to a system for carrying out the introduced method. The considered ring oscillators are used as random number generators.

BACKGROUND INFORMATION

Random numbers, which are referred to as the result of random elements, are required for many applications. So-called random number generators are used to generate random numbers. Random number generators are methods which supply a sequence of random numbers. A crucial criterion of random numbers is whether the result of the generation may be regarded as being independent of earlier results.

Random numbers are required for cryptographic methods, for example. These random numbers are used to generate keys for the encryption methods. Random number generators (RNGs) are used, for example, to generate master keys for symmetric encryption methods and handshake protocols in elliptic curve cryptography (ECC), which prevent a performance analysis attack and replay attacks.

There are two fundamental types of RNGs, namely pseudo random number generators for high throughputs and low security levels. Typically, a secret value is entered into a PRNG, and each input value will always result in the same output series. However, a good PRNG will output a number series which appears to be random and will pass the majority of tests.

Keys for cryptographic methods are subject to high requirements in terms of the randomness properties. Pseudo random number generators (PRNG), for example, represented by a linear feedback shift register (LFRS), are therefore not suitable for this purpose. Only a true random number generator (TRNG) meets the requirements at hand. This generator uses natural noise processes to obtain an unpredictable result. Noise generators which use the thermal noise of resistors or semiconductors or the shot noise at potential barriers, such as at p-n junctions, are common. Another option is the use of radioactive decay of isotopes.

While "traditional" methods use analog elements, such as resistors, as noise sources, digital elements, such as inverters, have been used frequently in the more recent past. These have the advantage of lower complexity in the circuitry layout since these are available as standard elements. In addition, such circuits may also be used in freely programmable circuits, such as FPGAs.

For example, the use of ring oscillators which represent an electronic oscillator circuit is known. In these, an odd number of inverters is interconnected to form a ring, whereby an oscillation having a natural frequency is created. The natural frequency depends on the number of inverters in the ring, the properties of the inverters, the conditions of the interconnection, namely the line capacitances, the operating voltage and the temperature. Due to the noise of the inverters, a random phase displacement occurs as compared to the ideal oscillator frequency, which is used as a random process for the TRNG. It must be noted that ring oscillators oscillate independently and do not require any external components, such as capacitors or coils.

The output of the ring oscillators is typically compressed or subjected to post processing to compress or pool the entropy and eliminate any bias.

One problem with the use of randomness arises in that the ring oscillator must be sampled, preferably in the vicinity of an anticipated ideal edge to obtain a random sample value. The publication by Bock, H., Bucci, M., Luzzi, R.: An Offset-compensated Oscillator-based Random Bit Source for Security Applications, CHES 2005, shows an option of how sampling is always carried out in the vicinity of an oscillator edge by the controlled shifting of the sampling point in time.

A method for generating random numbers with the aid of a ring oscillator is known from the publication European Patent No. 1 686 458, in which a first and a second signal are provided, the sampling of the first signal being triggered by the second signal. In the described method, a ring oscillator is sampled multiple times, always using only non-inverting delays, namely an even number of inverters as delay elements. Starting from a starting point, the oscillator ring is always sampled after an even number of inverters simultaneously or with mutual delay. In this way, the shift of the sampling point in time may be dispensed with; instead, the multiple sampling signals are evaluated.

The publication "Design of Testable Random Bit Generators" by Bucci, M. and Luzzi, R. (CHES 2005) introduces a method with which an influence on the random source may be detected. Attacks may thus be prevented. However, it does not allow a direct distinction between random values and deterministic values.

Another option is provided by the use of multiple ring oscillators. This is demonstrated in the publication Sunar, B. et al: Aproveable Secure True Random Number Generator with Built In Tolerance Attacks, WEE Trans. on Computers, 1/2007, for example. Here, sample values of multiple ring oscillators are concatenated to each other and evaluated.

The problem here is that correlations between the ring oscillators may occur, for example due to outside influences, so that the results obtained do not have a desired degree of entropy.

This problem is addressed by the present invention which is described hereafter, one focus being an implementation in an FPGA.

All high quality ASIC-based TRNGs are designed specifically for the customer, which means that the gates are placed and connected manually. This allows the developer to ensure many desired properties of the TRNG. Otherwise, the frequency and the jitter could not be adhered to. Above all, the quality of the random output must be high. Many statistical tests have been developed to check this. It should be noted that the performance capability of the TRNG may vary drastically as a function of the design. A test for checking the quality of the TRNG on the ASIC in real time has not existed previously.

Test circuits are able to detect special types of fault attacks. This is important in particular with FPGAs. An injected fault may not only temporarily change the functionality of an FPGA, but may also change stored bits in the SRAM of the LUT, which may permanently change the entire FPGA configuration. The SRAM of the LUT is sensitive in particular to radiation. LUT is a look up table in which the function value is stored as a function of the input bits. This table is stored in a static RAM (SRAM).

It is furthermore known to add RC filters to the supply lines to prevent frequency injection attacks. However, this is not possible with FPGAs.

SUMMARY

Against this background, a method and system are introduced. In the method, which is carried out using two oscillators, these oscillators should operate at a similar frequency and, if necessary, have a similar design.

A self-test for a TRNG is thus introduced, which treats problems in connection with the synthesis of the FPGA-TRNG and offers a higher degree of security against external attacks. Advantages of the described methods, at least in some of the embodiments, are:

A novel TRNG design is introduced, which in one embodiment includes two ring oscillators, each having three sampling points. This allows injection faults or transient faults to be detected. A slight modification makes it possible to detect routing problems caused by the FPGA synthesis.

The use of two ring oscillators and the comparison of their outputs make it possible to check whether the two oscillators correlate with each other. This is suitable in particular for the use in an FPGA. It is possible to check whether the oscillators are dependent on each other. This may occur, for example, when both oscillators are placed directly next to each other, or when someone is manipulating the circuit using a frequency injection attack. While an RC filter may be added to the energy supply line on an ASIC, this is not possible on an FPGA.

An additional test having low added complexity allows real-time testing of the quality of the TRNG output. If quality faults are detected, the TRNG output may be deactivated. If a developer is in the process of optimizing the design, the frequency may be changed in real time.

The ability to configure the ring oscillator sampling circuit allows the developer to adapt the quality and the performance capability of the TRNG, while also making it possible to test the TRNG design on several different types and generations of the FPGA.

The introduced system for a TRNG design includes two independently controlled ring oscillators, which allow the user to operate in a mode having low power consumption, in which only one ring oscillator is active. High performance capability regarding the security against attacks is nonetheless ensured in this operating mode.

With the introduced method, it is possible to ensure that a minimum entropy is always available, regardless of the sampling frequency. This is attributable to the fact that, without a correlation with each other, at least one oscillator also does not correlate with another reference clock, such as a system clock or frequency injection clock.

The introduced method allows information about the degree of entropy and thus makes it possible to detect whether a correlation exists between the ring oscillators. Threshold values may be predefined for this purpose, a correlation being established when these are reached or exceeded or when there is a threshold value shortfall.

Further advantages and embodiments of the present invention are derived from the description and the accompanying drawings.

It goes without saying that the above-mentioned features and those still to be described hereafter are usable not only in the particular described combination, but also in other combinations or alone, without departing from the scope of the present invention.

DETAILED DESCRIPTION

Figure 1:
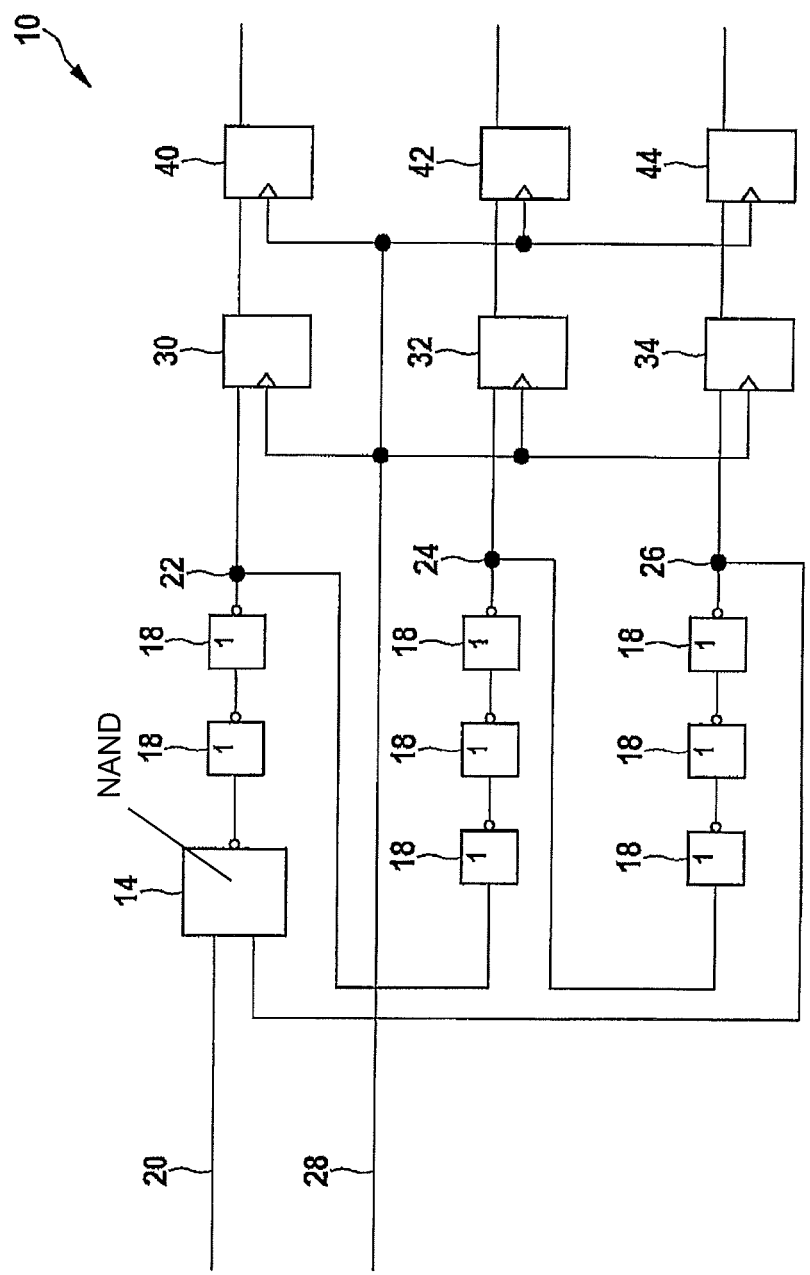
FIG. 1 shows one embodiment of a ring oscillator for carrying out the introduced method.

The present invention is shown schematically based on specific embodiments in the drawings and is described in greater detail hereafter with reference to the drawings.

FIG. 1 shows one embodiment of a ring oscillator for carrying out the described method, which overall is denoted by reference numeral 10. Ring oscillator 10 has a NAND gate 14 and eight inverters 18, and thus nine inverting elements. Ring oscillator 10 thus has an odd number of inverting elements and three taps or sampling points.

Ring oscillator 10 may be started and stopped using a first input 20. The illustration further shows a first sampling point 22, a second sampling point 24 and a third sampling point 26. The sampling rate is predefined via a second input 28. This means that, starting with first sampling point 22, sampling always takes place after an odd number of inverting elements. However, this is not absolutely necessary for the introduced method.

First sampling point 22 is sampled using a first flip flop 30, resulting in sample value s10. Second sampling point 24 is sampled using a second flip flop 32, resulting in sample value s11. Third sampling point 26 is sampled using a third flip flop 34, resulting in sample value s12. Another fourth flip flop 40 is assigned to first flip flop 30. This fulfills a memory function and outputs value s10', which chronologically precedes value s10, i.e., s10 and 10' are chronologically consecutive sample values of first sampling point 22. Accordingly, a fifth flip flop 42, which outputs s11', is assigned to second flip flop 32, and a sixth flip flop 44, which outputs s12', is assigned to third flip flop 34. Flip flops 40, 42 and 44 are suitable for resolving metastable states of flip flops 30, 32 and 34. Metastable states are created by the signal at input 28 being switched while an edge is present at sampling point 22, 24 or 26. Flip flops 30, 32 and 34 then require a certain time until a stable final state is reached. In the present example, this time is ensured in that the, then stable, value of flip flops 30, 32 and 34 is not taken over into flip flops 40, 42 and 44 until the subsequent active edge of the signal is present at input 28.

In principle, ring oscillator 10 may thus be composed of nine inverters 18, for example. One of these inverters 18 may be replaced by NAND gate 14 to be able to stop ring oscillator 10. Alternatively, this NAND gate 14 may also be replaced by a NOR gate.

In the embodiment shown, the values of ring oscillator 10 are stored simultaneously in a particular flip flop (FF) 30, 32, 34 at three different inverters. These taps should be preferably uniformly distributed over the elements of ring oscillator 10. For this reason, a tap or a sampling point 22, 24, 26 is provided in each case after three inverting elements in the case of nine inverting stages in ring oscillator 10. As was already mentioned, however, this is not required for the introduced method. It is also possible to provide another tap after an even number of inverting elements.

The number of inverter stages in ring oscillator 10 determines the frequency of the oscillator and should therefore be selected in such a way that the flip flops are able to store the particular signal value. If a preferably high oscillator frequency is used, the probability of being in the vicinity of an edge during sampling is higher. For this reason, a preferably low number of inverters is selected in the oscillator ring, however, so many that the flip flops are operable for the attained frequency. For a 180 nm technology, a frequency of approximately 1 GHz was determined for ring oscillator 12 having nine inverters 18 with the aid of simulation. The flip flops are able to store the signal values at this frequency, as was demonstrated.

The introduced method may be carried out with ring oscillator 10 according to FIG. 1, which has an odd number of inverting elements, values being tapped at at least two sampling points of the ring oscillator, and an odd number of inverting elements being located in each case between at least two directly consecutive sampling points.

A correlation with the system clock, and thus with the sample clock derived therefrom, may be established for ring oscillator 10. It is not possible to establish all correlations by the comparison of s10, s11, s12 with s10', s11', s12', even if the divisor value of the frequency divider is dividable by the number of the inverting elements in the oscillator ring. It may occur that sampling is carried out repeatedly at the same position in the oscillator cycle in each case after an arbitrary, for example constant, number of samplings. If this number is not simultaneously a divisor of the number of inverting elements in the oscillator, the above-described comparison does not provide any indication of the present correlation. It is still possible then to establish the correlation if all samplings are compared to the instantaneous sample. However, this is a very complex process.

When a ring oscillator is used in an FPGA, no option is available for influencing the frequency, such as by lowering the operating voltage of the oscillator using a resistor. It is therefore proposed, in particular for FPGAs, to use two ring oscillators which monitor each other and whose outputs are concatenated to each other. A correlation of these two oscillators is detectable, but not necessarily preventable. The correlation may be the result of coupling between the two oscillators, a shared correlation with the system clock, or an attack. It is assumed that diversity exists due to the different line delays in the two FPGA oscillators, the diversity ensuring a marginally different frequency. However, this is even more difficult to ensure in an ASIC. An attack is detected when the frequency of the two becomes exactly identical.

Figure 2:
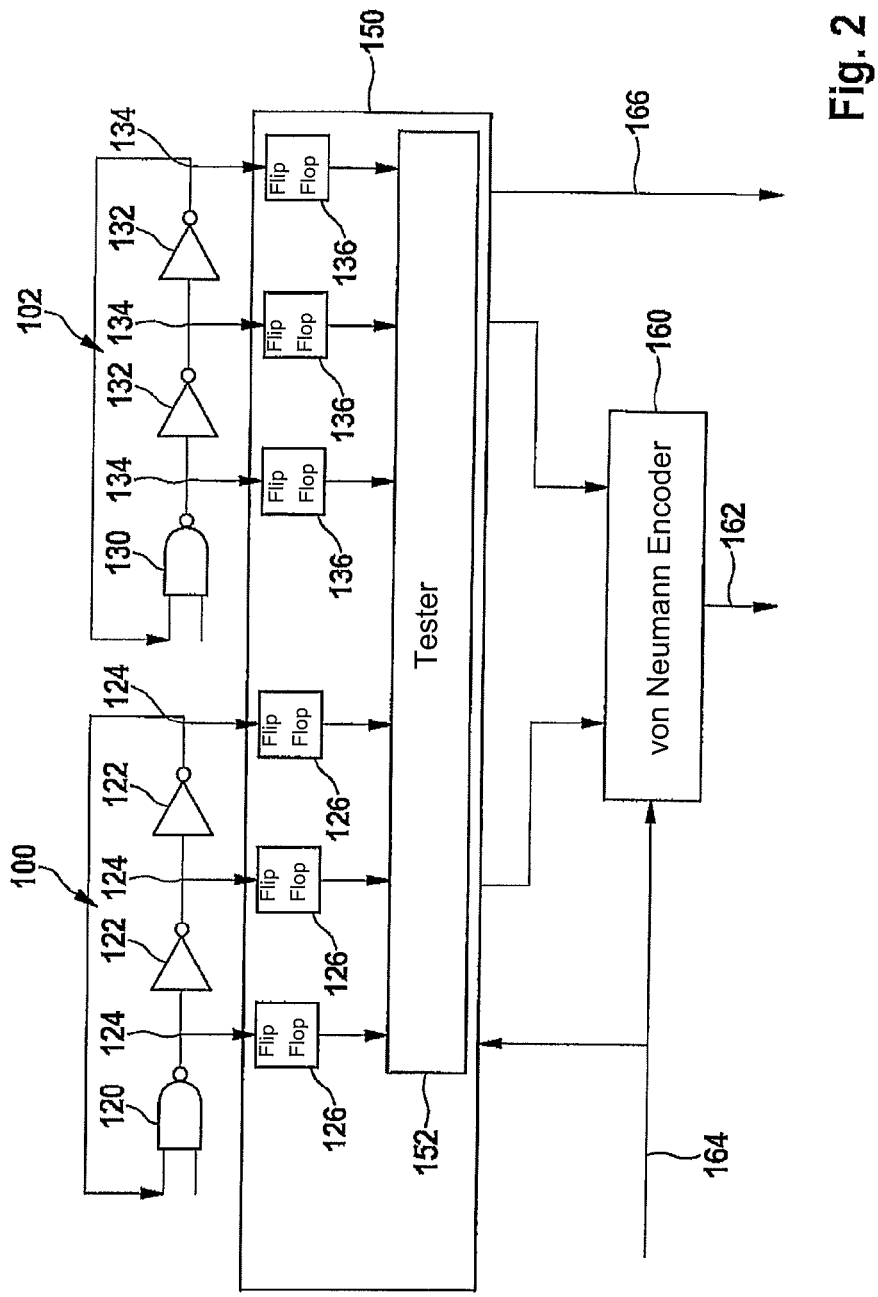
FIG. 2 shows a system for carrying out the method having two ring oscillators.

FIG. 2 shows one embodiment of the system for carrying out the method having a first ring oscillator 100 and a second ring oscillator 102. First ring oscillator 100 has one NAND gate 120 and two inverters 122 as inverting elements. A sampling point 124 is provided in each case between these inverting elements. These are connected in each case to a flip flop 126.

Second ring oscillator 102 accordingly has one NAND gate 130 and two inverters 132 having three sampling points 134. Sampling points 134 are once again connected to flip flops 136.

Flip flops 126 and 136 are provided in a configurable sampling unit 150, which additionally includes a unit 152 for testing and for combining bits. Sampling unit 150 is connected to a von Neumann encoder 160, which may include an additional XOR compressor. Von Neumann encoder 160 outputs random bits as output 162. The encoder is used to correct the non-uniform distribution of 0 and 1 in the random bits (bias). Moreover, an input 164 for the system clock and an output 166 for fault indication are provided.

The system shown implements a true random number generator (TRNG) having two ring oscillators 100 and 102. The basic structure of a TRNG is thus shown in FIG. 2. Here, two independent ring oscillators 100 and 102 are easily discernible. As a function of the FPGA which is used, these ring oscillators 100 and 102 run at 100 MHz, and their frequency and phase will drift away from each other as soon as they are activated. To give ring oscillators 100 and 102 sufficient time to do so, no sampled data should be output from ring oscillators 100 and 102 to the output for the first thousand oscillations. As soon as the initialization phase is completed, the sampling circuits begin to sample ring oscillators 100 and 102 at three sampling points at a defined frequency. This sampling frequency is programmable and is settable for any design and FPGA. After each sampling, a test circuit in tester 152 compares the outputs of both ring oscillators over the last samplings to detect potential attacks or quality faults. This is described in detail hereafter.

If the instantaneous set of random bits is fine, three samplings of each ring oscillator are combined into two data strings and transmitted to a post processing unit in von Neumann encoder 160. In one possible embodiment, an XOR compressor is used to increase the entropy per bit. If both ring oscillators 100 and 102 are active, the two random data strings may be combined and von Neumann encoder 160 to remove any bias from the random output. The output of the unit is a random 32-bit number, which other components on the FPGA may use. If more robust post processing against fault injection attacks is required, an additional device may be used.

It is described hereafter how each ring oscillator 100 and 102 may detect a fault injection. A fault exists, for example, in that the value is flipped in one of the sampling registers. This is achievable with the aid of a laser or a slightly radioactive material or particle stream. Such faults occur at high altitude above sea level, for example. Such attacks are not sufficiently precise for attackers. They rather rely on statistical variables of a large number of fault injections.

In the introduced system having two ring oscillators, which each include three inverting elements, the following states or sample values are possible, which are listed in Table 1.

TABLE 1

| Valid ring oscillator sample values | |
| --- | --- |
| 001 | 011 |
| 010 | 110 |
| 100 | 101 |

It is not possible to obtain 000 or 111 if the ring oscillators are composed of elements which have an equal flank steepness for flanks in both directions 0-1 or 1-0 for each output or internal node and if the wiring of all these elements occurs under equal conditions, such as equal load capacity, for example. If such a value is nonetheless sampled, it is clear that one of the following cases has occurred:
  the ring oscillator does not operate correctly;
  a fault was injected into the sampling circuit;
  high different line delays exist between each inverter and sampling unit 150;
  the digital elements used have different delay properties for edges in the opposite direction.

Regarding the first case, the functionality of the ring oscillator may be changed if a fault was injected into the configuration SRAM used for the LTUs which implement the ring oscillator. In this case, the TRNG must be shut off permanently. As an alternative, the FPGA may be reconfigured.

In case two, the procedure according to the known pattern is required.

In the third case, which is FPGA-specific since the development tools did not supply a satisfactory result, the TRNG should be manually placed onto the FPGA, or better tools should be used.

All this is also possible if only one ring oscillator is operated, to save energy, for example.

When both ring oscillators 100 and 102 are operating, the TRNG will supply not only random bits per unit of time, but also makes it possible to detect frequency injection attacks. During such an attack, the attacker injects a preferably high frequency into the supply line of the FPGA. If this frequency is suitably selected, the attack is able to control the oscillation frequency of one or both ring oscillators. As soon as this has been achieved, the attacker is able to ascertain or calculate which bits the TRNG will generate since jitter is no longer the source of the entropy. It should be noted that the output of the TRNG is typically used to generate keys for cryptographic algorithms. If the attacker locates the key, the encryption is ineffective.

One problem with frequency injection attacks is that all components of the FPGA are influenced. Since two ring oscillators are provided in the embodiment shown herein, these may correlate as a result of the attack. Since the output of each inverter is sampled, the exact state of the two oscillators is known. If the two ring oscillators generate the same output or values which are in each case shifted by the same magnitude, it is possible to establish that the oscillators are dependent on each other. The valid states are known from Table 1. It should also be noted that the tester must check multiple values to establish that the oscillators are dependent on each other. This is related to the fact that random processes are taking place, and it may be possible that the oscillators may appear to be dependent on each other for several clock cycles.

Another possible reason for a correlation exists when the two oscillators are situated too closely together on the FPGA. This is easy to check.

In addition, it is possible in the operating mode having low power consumption to activate the second ring oscillator only intermittently to check whether a frequency injection attack exists. Under normal circumstances, it takes several 100 ms to carry out such an attack. Thus, it may be sufficient to activate the second oscillator and carry out the test every 10 ms.

To implement the fault detection functionality, the following two implementations are proposed.

1st Implementation

Possible ring oscillator states are defined in sequential order, as is shown in Table 2. As a result of the activated NAND gate in the ring oscillator of FIG. 2, it is known what the initial state of oscillator 101 is. The next state, when the ring oscillator is activated, would be 001 since the output of the NAND gate would change as soon as the activation signal becomes high. These states continue until they are repeated after state 5.

TABLE 2

Chronological ring oscillator values

| Oscillator | State # ($S_\#$) |
|---|---|
| 101 | 0 |
| 001 | 1 |
| 011 | 2 |
| 010 | 3 |
| 110 | 5 |
| 100 | 5 |
| 101 | 0 |

Using this information, the difference or delta between the two oscillators may be calculated. This is carried out by calculating f(x), which represents delta, as defined by the following function:

$$f(x) S_0 - S_1 \text{ if } S_0 >= S_1$$

$$f(x) = (S_0 + 5) - S_1 \text{ if } S_0 < S_1$$

S0: present state of first oscillator 100
S1: present state of second oscillator 102
Warning counter=unchanged if f(x)new≠f(x)old
Warning counter=to be incremented if f(x)new=f(x)old
As soon as a delta is calculated, it is possible to compare the present delta to the preceding delta. If the deltas are different, no fault exists. If the deltas are identical, the warning counter may be incremented. When this counter exceeds a threshold, a formal fault is indicated. This implementation requires only a 3-bit delta register, a few comparators and adders, and a small table, which is implementable by using basic gates.

2nd Implementation

This implementation represents a slightly larger and more powerful implementation and uses a small register block or a block SRAM to set up the following table:

TABLE 3

Register mapping for a ring oscillator test

| Address | Data # |
|---|---|
| 000 | 000 |
| 001 | 000 |
| 010 | 000 |
| 011 | 000 |
| 100 | 000 |
| 110 | 000 |
| 111 | 000 |

Address: state of first oscillator 100
Data: state of second oscillator 102

Every time the ring oscillators are sampled, the new state of second oscillator 102 is written into the table, more particularly to the address, which is calculated by the state of first oscillator 100. If the ring oscillators are dependent on each other, the values in the table will not change. This may be checked by comparing the new table value to the preceding value as soon as the new value is written into the table. The use of a warning counter in accordance with Implementation 1 is also possible.

It is not necessary to use a table having all states. Only the achievable states must be provided. If other states are assumed, a fault message may be generated. It is furthermore possible to provide only one register, or few registers, and to only check whether the oscillators are dependent on each other when the state of one of the oscillators takes on a specific value.

In addition to the introduced methods, it is also possible to carry out other standardized statistical tests. For example, offline tests are known, which are suitable for this purpose.

In both implementations, values at the output of first ring oscillator 100 must be concatenated to values at an output of second ring oscillator 102, so that each concatenation creates a combination of the value of first ring oscillator 100 and of the value of second ring oscillator 102. A correlation is detected based on a comparison of one combination with at least one chronologically preceding concatenation.

This may be carried out, as in the second implementation, by comparing a value which is written into a table field to a preceding value. The value is determined by the output of second ring oscillator 102 and the address of the table field in question due to the output of first ring oscillator 100.

In the first implementation, a difference between states of two ring oscillators 100 and 102 is compared to a difference of a preceding concatenation.

What is claimed is:

1. A method for detecting a correlation of a first ring oscillator with a second ring oscillator, comprising:
   iteratively, according to a circuit sampling frequency:
      sampling, by circuitry, values at an output of the first ring oscillator and at an output of the second ring oscillator;
      concatenating, by the circuitry, the values sampled in the respective iteration at the outputs of the first and second ring oscillators to each other, thereby forming a respective combination of the values sampled in the respective iteration at the outputs of the first and second ring oscillators;

storing, by the circuitry and in a data storage device of the circuitry, the respective combination formed in the respective iteration; and comparing, by the circuitry, the respective combination formed in the respective iteration to another of the combinations formed by the circuitry and stored in the data storage device in an immediately preceding one of the iterations; and detecting the correlation, by the circuitry and based on at least one of the comparisons.

2. The method as recited in claim 1, wherein:

the storing includes using the portion of the combination corresponding to the value of the first ring oscillator to determine an address of a respective field of a table into which to write the portion of the combination corresponding to the value of the second ring oscillator; and the correlation is detected based on a comparison of the value which is written into the table field in the current iteration to a value written to the table in a preceding one of the iterations based on the combination of the preceding iteration.

3. The method as recited in claim 1, wherein:

the concatenating includes forming a difference between states of the two ring oscillators in the respective iteration, the states being defined in a sequential order of respectively corresponding numbers and being assigned, respectively, to each possible value at the output of each of the first and second ring oscillators; and the comparing is of the differences formed in a respective pair of sequential ones of the iterations.

4. The method as recited in claim 1, wherein the circuitry is part of a Field Programmable Gate Array (FPGA).

5. The method as recited in claim 1, further comprising incrementing, by the circuitry, a warning counter as a function of results of the comparisons.

6. The method as recited in claim 5, further comprising issuing, by the circuitry, a fault signal when the warning counter exceeds a predefined threshold.

7. A system for detecting a correlation of a first ring oscillator with a second ring oscillator, comprising:

an arrangement for concatenating values at an output of the first ring oscillator to values at an output of the second ring oscillator so that, as a result of each concatenation, a combination of the value of the first ring oscillator and of the value of the second ring oscillator is created; and an arrangement for detecting the correlation based on a comparison of one combination with at least one chronologically preceding combination.

8. The system as recited in claim 7, wherein the system is implemented in an FPGA.

9. The system as recited in claim 7, further comprising:

a memory unit in which a table having table fields is stored, reference to the table fields being made via addresses, with each concatenation the value of the first ring oscillator determining an address into whose assigned table field the value of the second ring oscillator is written, wherein the correlation is detected based on a comparison of the value which is written into the table field to a preceding value.

10. The system as recited in claim 7, further comprising:

an arrangement for defining ring oscillator states in sequential order and thus assigning a state which is represented by a number to each possible value at the output of each ring oscillator;

an arrangement for forming a difference between the states of the two ring oscillators with each concatenation; and comparing the difference from one concatenation to the difference from at least one preceding concatenation.

* * * * *